United States Patent Office 3,135,088
Patented June 2, 1964

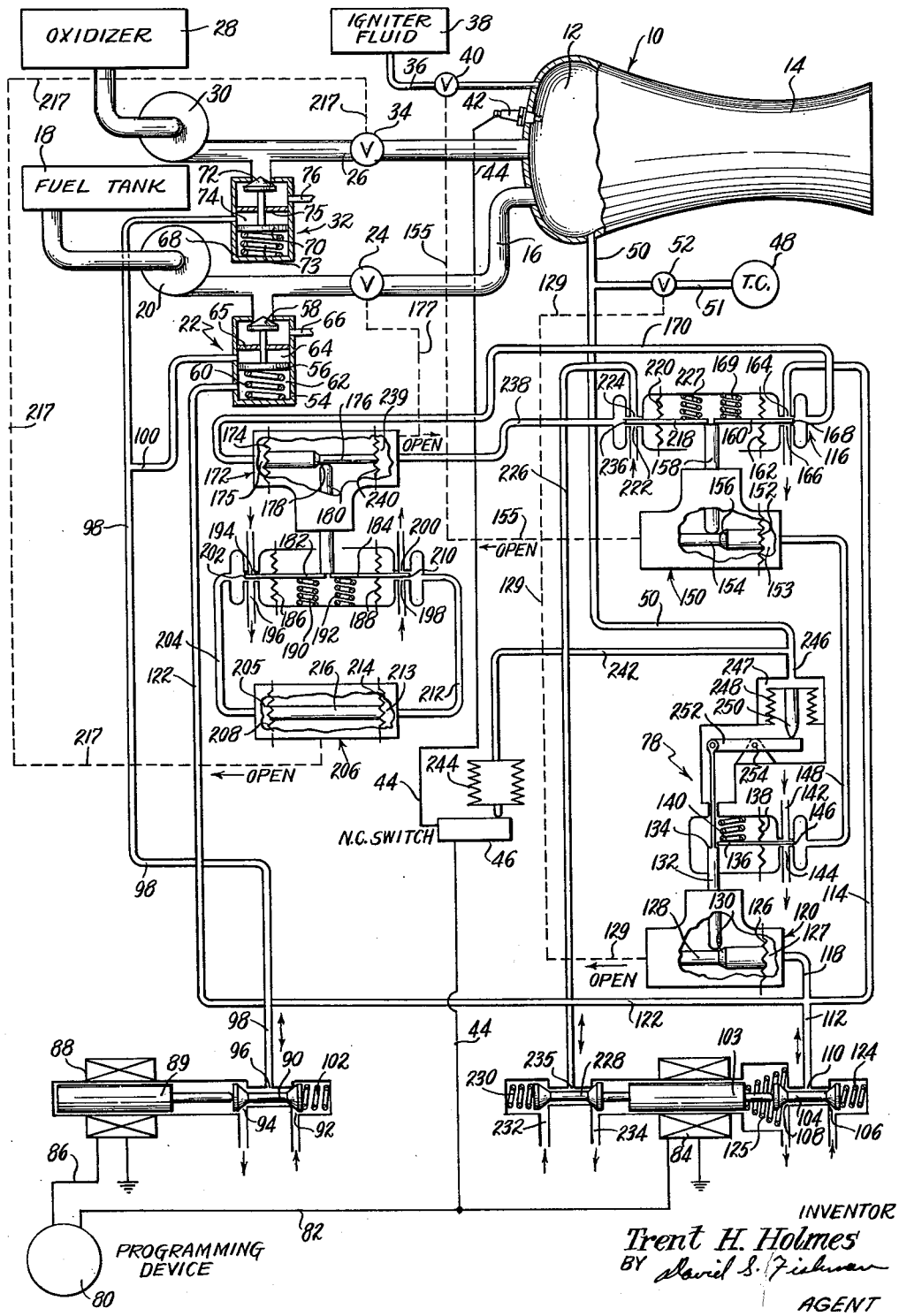

3,135,088
SEQUENCING SYSTEM
Trent H. Holmes, Rocky Hill, Conn., assignor to United Aircraft Corporation, East Hartford, Conn., a corporation of Delaware
Filed Mar. 2, 1961, Ser. No. 92,993
16 Claims. (Cl. 60—35.6)

This invention relates to a sequencing system, and more specifically to a system of valve and switch operators for a rocket engine adapted to perform one predetermined sequence of operational steps during a rocket engine starting cycle, and a different sequence of operational steps during a shut down cycle.

In order to safely start or shut down a rocket engine, it is essential that the various control valves and switches be operated in a definite, predetermined, sequence, and that certain valves (or switches) must not be opened or closed until certain other valves (or switches) have been operated. Furthermore, in shut down, the various control elements are not necessarily operated in the same sequence, or in a reverse sequence, as in starting. As an example, in starting, the igniter fluid valve is opened before the oxidizer and fuel supply valves, but on shut down, the igniter fluid valve remains open until the fuel and oxidizer supply valves close to assure that no unburned fuel remains in the combustion chamber. In starting, the fuel supply valve is opened before the oxidizer supply valve, and in shut down the same sequence takes place.

It is an object of this invention, therefore, to provide a novel sequencing system to effect a safe and positive starting of a rocket engine, and a safe and positive shut down thereof.

It is a further object to provide a novel sequencing system that is fully automatic in operation.

It is a still further object to provide a novel sequencing system for a rocket engine which, on shut down, assures that all of the various control elements are in proper position for restarting when required.

It is a still further object to provide a novel method of starting and shutting down a rocket engine in a safe and positive manner.

The attainment of the above objects and other objects and advantages will be apparent from the following description in conjunction with the accompanying drawing, in which the single figure represents a diagrammatic hook-up of a rocket engine and a sequencing system for starting and shutting down the same.

Referring to the single figure of the drawing, the reference numeral 10 designates a conventional rocket engine having a combustion chamber 12 and a reaction nozzle 14. Liquid fuel is supplied to the combustion chamber by a fuel supply line 16 from a suitable source of fuel 18, the supply line including a pump 20, a relief valve 22 and a supply valve 24 in series between the fuel source 18 and the combustion chamber 12. Liquid oxidizer, such as liquid oxygen, for example, is fed to the combustion chamber by a supply line 26 from a suitable source of oxidizer 28, the supply line including a pump 30, a relief valve 32 and a supply valve 34 between the source and the combustion chamber. The pumps 20 and 30 may be of the centrifugal type and may be driven by a single driving means, or by separate driving means, as is conventional in the art.

A supply line 36 is also connected with the combustion chamber 12 for feeding an igniter fluid from a source 38, for the purpose of maintaining a flame within the combustion chamber for starting the rocket engine to assure initiation of combustion of the fuel and oxidizer fed thereto. The supply line 36 includes a supply valve 40. The igniter fluid may be any suitable readily combustible material, preferably a monopropellant, which is supplied to the combustion chamber 12 during the starting operation, as described hereinafter, and is ignited by an igniter 42 including a conductor 44 having a normally closed switch 46 therein.

A thrust control device 48 is connected with the interior of the combustion chamber 12 by a conduit 50 and a branch 51 having a trap valve 52 therein. The thrust control device may be any conventional means having a pressure chamber responsive to the combustion chamber pressure and adapted to control the rocket thrust as a function of such pressure. Valve 52, when open, subjects the thrust control device 48 to the pressure existing within the combustion chamber 12, and when closed, traps the pressure gases within the pressure chamber of the thrust control device, for a purpose to be explained more fully hereinafter in the description of operation.

The fuel relief valve 22 comprises a cylinder 54 having a piston 56 slidable therein and connected with a movable valve element 58. A spring 60 within a first pressure chamber 62 in the cylinder urges the piston 56 and the movable valve element 58 toward the valve closing position. A second pressure chamber 64 is defined between the piston 56 and a partition 65. The space above the partition 65 is connected with the ambient atmosphere or to a dump by way of a vent 66.

The oxidizer relief valve 32 comprises a cylinder 68 in which a piston 70 is reciprocably mounted, the piston being connected with a movable valve element 72. A spring 73 acts on the lower face of the piston 70 and urges the valve element 72 toward its closed position. The upper face of the piston 70 and a partition 75 define a pressure chamber 74 to which a pressure fluid may be admitted, as explained more fully hereinafter. The space above the partition 75 is vented at 76 to the ambient atmosphere or to a dump.

The various valves and the switch 46 described above are under the control of a sequencing system designated in its entirety by the numeral 78. The sequencing system effects a predetermined schedule of valve and switch operation to start the rocket engine when desired, and to shut down the engine. The sequencing system may be manually controlled, or may be automatically controlled by a conventional programming device 80.

A first conductor 82 connects the programming device 80 with a start solenoid 84, and a second conductor 86 connects the programming device with a pre-start solenoid 88.

The movable core 89 of the pre-start solenoid 88 contacts a pilot valve having a movable member controlling a port 92 connected with a source of pressure fluid, such as helium, and a discharge port 94 connected with the ambient atmosphere. A third port 96, connected with the pilot valve 90, is placed in communication either with the source of pressure fluid when the port 92 is uncovered, or with the ambient atmosphere when the port 94 is uncovered. Port 96 is connected with a conduit 98 communicating with the pressure chamber 74 of the fuel relief valve 32. A branch 100 from the conduit 98 communicates with the pressure chamber 64 of the fuel relief valve 22. A spring 102 urges the movable member of the pilot valve 90 and the solenoid core 89 toward the left, in which position the pressure port 92 is closed and the discharge port 94 is open, thereby venting the pressure chambers 64 and 74 to the atmosphere by way of the branch 100, conduit 98, port 96, pilot valve 90 and port 94.

The start solenoid 84 includes a movable core 103 contacting the movable member of a pilot valve 104 which is movable to control a port 106 connected with a source of pressure fluid, such as helium, and a port 108 leading to the ambient atmosphere. A third port 110 in the pilot valve is connected with a conduit 112 having a first branch 114 communicating with a pilot valve 116, a second branch 118 communicating with a servomotor 120, and a third branch 122 communicating with the pressure chamber 62 of the fuel relief valve 32. A spring 124 urges the movable member of the pilot valve 104 toward the left to close the pressure port 106 and to open the discharge port 108, and a spring 125 urges the movable core 103 of the solenoid 84 toward the left.

The servomotor 120 includes a flexible diaphragm 126 defining a movable wall of a pressure chamber 127, which diaphragm is connected with a link 128 having a shoulder 130 adapted to engage and move a rod 132. The link 128 is connected with the trap valve 52 by a connecting member 129 in such a manner that movement of the link toward the left is effective to move the trap valve to its open position.

The rod 132 includes a shoulder 134 engageable with the movable member of a pilot valve 136 resiliently carried by a diaphragm 138. A spring 140 acts on one end of the movable member of the pilot valve tending to force it against the shoulder 134. The pilot valve includes a pressure port 142, connected with a source of pressure, for example, helium, a discharge port 144 to the ambient atmosphere, and a port 146 communicating with a conduit 148 having connection with a servomotor 150.

The servomotor 150 is identical in construction with servomotor 120, including a flexible diaphragm 152 defining a pressure chamber 153. The flexible diaphragm is attached to a movable link 154, which link, in turn, is connected with the igniter valve 40 by a connecting member 155 in such manner that movement of the link toward the left causes opening of the valve 40.

The link 154 carries a shoulder 156 adapted to engage and move a rod 158 engageable with one end of the movable member of a pilot valve 160 resiliently supported on a diaphragm 162. The other end of the movable member of the pilot valve 160 controls a port 164 communicating with the conduit 114, and a discharge port 166 to the ambient atmosphere. The pilot valve also includes a third port 168 communicating with one end of a conduit 170, the other end connecting with a servomotor 172. A spring 169 urges the movable member of the pilot valve 160 into engagement with the rod 158.

The servomotor 172 is of the double acting type, including a first diaphragm 174 defining a pressure chamber 175. The diaphragm is attached to a link 176 which is connected with the fuel supply valve 24 by a connecting member 177. Movement of the link 176 toward the right is effective to move the fuel supply valve 24 to its open position.

The link 176 includes a shoulder 178 adapted to engage one end of a rod 180 when the link is moved toward the right, the other end engaging one end of the movable member of a first pilot valve 182 resiliently supported by a diaphragm 186 and one end of the movable member of a second pilot valve 184 resiliently supported by a diaphragm 188. A pair of springs 190 and 192 urge the movable members of the pilot valves 182 and 184 into contact with the rod 180. The other end of the movable member of the pilot valve 182 controls a pressure port 194 connected with a source of fluid under pressure, for example, helium, and a discharge port 196 to the ambient atmosphere. The other end of the movable member of the pilot valve 184 similarly controls a pressure port 198 connected with a source of pressure fluid, such as helium, for example, and a discharge port 200 to the ambient atmosphere. The pilot valve 182 also includes a port 202 communicating with one end of a conduit 204, the other end connected with a first pressure chamber 205 of a double acting servomotor 206. Pressure chamber 205 is defined by a resilient diaphragm 208. The pilot valve 184 also includes a port 210 communicating with one end of a conduit 212, the other end connecting with a pressure chamber 213 of the servomotor 206. Pressure chamber 213 is defined by a resilient diaphragm 214. Diaphragms 208 and 214 are attached to opposite ends of a link 216, which link is connected with the oxidizer supply valve 34 by a connecting member 217. Movement of the link 216 toward the left affects opening of the oxidizer supply valve 34, and movement toward the right effects closing thereof.

The upper end of the rod 158 is also engageable with one end of a movable member of a pilot valve 218 resiliently supported by a diaphragm 220. The other end of the movable member of the pilot valve is shiftable to control a pressure port 222 connected with a source of fluid under pressure, such as helium, for example, and a port 224 communicating with one end of a conduit 226 having connection, at its other end, with a pilot valve 228. A spring 227 engages the movable member of the pilot valve 218 and urges it against the upper end of the rod 158.

A spring 230 engages one end of the movable member of the pilot valve 228 to urge it against one end of the movable core 103 of the solenoid 84. The movable member of the pilot valve 228 controls a pressure port 232 communicating with a source of pressure fluid, such as helium, and a discharge port 234 to the ambient atmosphere. The pilot valve 228 also includes a port 235 communicating with one end of the conduit 226. In the position shown in the drawing, in which the start solenoid is deenergized, the spring 125 is effective to move the movable core 103 toward the left, which also moves the movable member of the pilot valve 228 to the left to open the pressure port 232 and to close the discharge port 234.

The pilot valve 218 also includes a port 236 which communicates with one end of a conduit 238, the other end being connected with a pressure chamber 239 of the servomotor 172, the pressure chamber being defined by a resilient diaphragm 240 attached to one end of the link 176.

The conduit 50 connects with a pressure branch 242 communicating with the interior of a bellows 244, the movable wall of which connects with the switch 46. Another pressure branch 246 from the conduit 50 communicates with a pressure chamber 247 having a movable wall 248 with a stem adapted to engage one end of a lever 252, the other end of the lever being connected with the upper end of the rod 132. Lever 252 is pivotally supported on a fulcrum 254.

*Operation*

The drawing shows the rocket engine and the control system in the shut down condition, in which the supply valves 24, 34 and 40 are closed, the trap valve 52 is closed, the switch 46 is also closed, and the solenoids 88 and 84 are deenergized, whereby the movable member of the pilot valve 90 closes the pressure port 92 and opens the discharge port 94; the movable member of the pilot valve 104 closes the pressure port 106 and opens the discharge port 108; and the movable member of the pilot valve 228 opens the pressure port 232 and closes the discharge port 234. As a result, the pressure chambers 64 and 74 of the fuel relief valve 22 and the oxidizer relief valve 32, respectively, are in communication with the atmosphere by way of the branch 100, conduit 98, pilot valve 90 and discharge port 94; the pressure chamber 62 of the fuel relief valve 22 is in communication with the atmosphere by way of the branch 122, conduit 112 and pilot valve 104. The pressure chamber 127 of the servomotor 120 communicates with the atmosphere by way of branch 118, conduit 112 and pilot valve 104. As there is no pressure in the combustion chamber 12 of the rocket engine 10, the bellows 244 is collapsed, and the movable wall 248 of the pressure chamber 247 is also collapsed. The spring 169 forces the left hand end of the movable member of the pilot valve 164 against the upper end of the rod 158, thereby connecting the discharge port 166 with the port 168, conduit 170 and pressure chamber 175 of the servomotor 172. At the same time the spring 227 urges the right hand end of the movable member of the pilot valve 218 against the upper end of the rod 158, thereby connecting the pressure chamber 239 of the servomotor 172 with a source of pressure fluid by way of conduit 238, and ports 236 and 222 of the pilot valve 218, which positively holds the link 176 of the servomotor 172 toward the left and positively maintains closed the fuel supply valve 24. In this position of the servomotor 172, the springs 190 and 192 force the ends of the movable members of the pilot valves 182 and 184, respectively, upwardly against the end of the rod 180, which closes pressure port 198 and opens discharge port 200 of the pilot valve 184, and which opens pressure port 194 and closes discharge port 196 of the pilot valve 182, thereby admitting pressure fluid to the pressure chamber 205 by way of ports 194 and 202, and conduit 204, and venting pressure from the pressure chamber 213 of the servomotor 206 by way of conduit 212 and ports 210 and 200, to positively maintain the link 216 of the servomotor 206 toward the right to maintain closed the oxidizer supply valve 34. The spring 140 urges the movable member of the pilot valve 136 against the upper end of the shoulder 134 of the rod 132, which closes pressure port 142 and opens discharge port 144, thereby connecting the pressure chamber 153 of the servomotor 150 with the atmosphere by way of conduit 148, ports 146 and 144, whereby the link 154 of the servomotor 150 is maintained toward the right to positively maintain closed the igniter fluid supply valve 40.

The oxidizer supply line 26 is filled with liquid oxidizer up to the closed supply valve 34, filling the pump 30. Spring 73, acting upwardly on the piston 70 and the movable valve element 72, maintains the relief valve 32 closed. Should the pressure in the supply line 26 increase beyond the limit of the force of the spring 73, the movable valve element 72 is unseated, permitting the bleed of excess pressure to the atmosphere or to a dump by way of vent 76. Spring 60 similarly maintains the fuel relief valve 22 closed, permitting the bleeding by way of the vent 66 in the event of excessive pressure in the fuel supply line 16, which is maintained filled with liquid fuel up to the closed supply valve 24, including the pump chamber.

When it is desired to start operation of the rocket engine, the programming device 80 is set into operation, which closes a switch to energize the pre-start solenoid 88 by a signal through the conductor 86, causing movement of the movable core 89 toward the right against the force of the spring 102, causing the movable member of the pilot valve 90 to close the discharge port 94 and to open the pressure port 92, admitting pressure fluid by way of ports 92 and 96, conduit 98 and branch 100, to the pressure chamber 74 of the oxidizer relief valve 32 and to the pressure chamber 64 of the fuel relief valve 22, to open the movable valve elements 72 and 58 thereof to allow the escape of oxidizer and fuel, respectively, from the supply lines 26 and 16. This escape of oxidizer and fuel is permitted for a very short duration of time, sufficient for the flow of fuel and oxidizer through the pumps 20 and 30, respectively, to precool the same and to assure that the fuel and oxidizer will not be vaporized therein to cause vapor lock. After a short duration of time, the pre-start solenoid 88 is deenergized, whereby the spring 102 returns the movable valve element of the pilot valve 90 toward the left to close the pressure port 92 and to open the discharge port 94, which vents the pressure chambers 64 and 74 of the fuel and oxidizer relief valves 22 and 32 to the atmosphere, permitting the springs 62 and 73, respectively, to close the movable valve members 58 and 72.

Continued operation of the programming device 80 connects the conductor with a source of electricity, which energizes the solenoid 84, and energizes the igniter 42 by way of the branch conductor 44 and the normally closed switch 46.

Energization of the solenoid 84 moves the core member 103 to the right against the compression of the springs 125 and 124, moving the movable member of the pilot valve 228, under the force of the spring 230, to the right to close pressure port 232 and to open discharge port 234, and at the same time moving the movable member of the pilot valve 104 to the right to open pressure port 106 and to close discharge port 108. Fluid under pressure from the port 106 is effective, by way of pilot valve 104, port 110, conduit 112, and branch 122 and pressure chamber 62 of the fuel relief valve 22, to load the relief valve to prevent opening under normal operating pressures of the fuel pump 20. At the same time, pressure fluid is effective, by way of the branch 118 and pressure chamber 127 of servomotor 120, to open the trap valve 52 and to permit the discharge of the trapped pressure gases therein by way of the combustion chamber 12 of the rocket engine 10. The movement of the link 128 of the servomotor 120 brings the shoulder 130 against the rod 132, causing upward movement of the latter to rotate the movable member of the pilot valve 136 clockwise, which opens pressure port 142 and closes discharge port 144. Pressure fluid from port 142 is effective, by way of the pilot valve 136, port 146, conduit 148 and pressure chamber 153 of the servomotor 150 to move the link 154 toward the left to open the igniter fluid supply valve 40, permitting the flow of readily ignitable fluid into the combustion chamber 12, where it is quickly ignited by the igniter 42 to produce an igniting flame. As the link 154 moves toward the left, the shoulder 156 thereon engages the lower end of the rod 158 to rotate the movable member of the pilot valve 160 clockwise, and to rotate the movable member of the pilot valve 218 counterclockwise. The movable member of the pilot valve 160 uncovers the port 164 and closes the discharge port 166, permitting the flow of pressure fluid by way of the conduit 112, branch 114, ports 164 and 168, and conduit 170 to the pressure chamber 175 of the servomotor 172. At the same time, the movable member of the pilot valve 218 closes the pressure port 222 and opens the port 224, permitting the discharge of pressure fluid from the pressure chamber 239 of the servomotor 172 by way of the conduit 238, ports 236 and 224 of the pilot valve 218, conduit 226 and ports 235 and 234 of the pilot valve 228 to the ambient atmosphere. The pressure differential in the pressure chambers 175 and 239 moves the connecting link 176 toward the right to open the fuel supply valve 24, while the shoulder 178 on the link 176 engages the upper end of the rod 180 to cause rotation of the movable member of the pilot valve 184 in a counterclockwise direction to open the pressure port 198 and to close the discharge port 200, and to cause rotation of the movable member of the pilot valve 182 in a clockwise direction to close the pressure port 194 and to open the discharge port 196. Pressure fluid from the pressure port 198 is effective, by way of the pilot valve 184, port 210, conduit 212 and pressure chamber 213 of the servomotor 206 to move the link 216 of the servomotor 206 toward the left to open the oxidizer supply valve 34, while pressure fluid discharges from the pressure chamber 205 by way of the conduit 204 and ports 202 and 196 of the pilot valve 182.

The successive opening of the fuel and oxidizer supply valves first allows the fuel to enter the combustion chamber 12 and to be heated by the igniter flame. Should there be any oxidizer present, the fuel will be mixed therewith and ignition will be initiated, but, if not, the subsequent opening of the oxidizer supply valve 34 permits the flow of oxidizer into the combustion chamber to mix with the fuel therein and the mixture is ignited by the flame from the igniter supply line 36. The pressure quickly rises within the combustion chamber, and the fuel and oxidizer supplies are controlled by the thrust control device 48 in a conventional manner. The admission of pressure fluid to the pressure chamber 62 of the fuel relief valve 22 effects loading thereof and prevents the opening at normal operating pressures, since the spring 60 is designed to have sufficient strength to permit the opening of the relief valve at lower pressures when the rocket engine is shut down, to assure that pressure will not build up in the supply line 16 and leak past the closed supply valve 24. On the other hand, the spring 73 in the oxidizer relief valve 32 has sufficient strength to prevent opening at normal operating pressures in the oxidizer supply line 26.

The ignition fluid source 38 contains a metered supply of readily ignitable fluid, such as a monopropellant, which is sufficient to enable the maintenance of a flame in the combustion chamber long enough to raise the temperature of the combustion chamber to a point to assure continued combustion of the fuel and oxidizer supplied thereto. If the rocket engine continues in operation long enough, all of the metered supply of igniter fluid is consumed, since the supply valve 40 remains open so long as the rocket engine is in operation and closes only after the oxidizer and fuel supply valves have been closed, as appearing hereinafter.

When the pressure rises within the combustion chamber 12, as the result of combustion of the fuel and oxidizer therein, the pressure is effective, by way of the conduit 50 and branch 242, to expand the bellows 244 to open the normally closed switch 46 to deenergize the igniter 42, which is no longer required. At the same time, the pressure is effective, by way of the branch 246 and pressure chamber 247, to move the movable wall 248 to rotate the lever 252 clockwise, thereby maintaining the rod 132 in its raised position irrespective of the position of the link 128 of the servomotor 120.

To shut down the rocket engine, the programming device 80 discontinues the supply of current to the conductor 82 to deenergize the start solenoid 84, whereupon the spring 125 moves the core member 103 and the movable member of the pilot valve 228 toward the left, and the spring 124 moves the movable member of the pilot valve 104 to the left. Pressure fluid escapes from the pressure chamber 127 of the servomotor 120 by way of branch 118, conduit 112 and ports 110 and 108 of the pilot valve 104, permitting the link 128 to move toward the right to close the trap valve 52 to the thrust control device 48, which traps pressure fluid within the pressure chamber of the control device to prevent it from operating the conventional control members to maintain the predetermined thrust for which it is set when the pressure drops within the combustion chamber 12 as a result of shut down. At the same time the pressure fluid from the pressure chamber 62 of the fuel relief valve 22 is discharged by way of the branch 122, conduit 112 and ports 110 and 108 of the pilot valve 104. The relief valve 22 is thereupon unloaded, and permits some of the fuel from the supply line 16 to escape to dump by way of the vent 66 even though the supply valve 24 may still be open. Although movement of the link 128 of the servomotor 120 toward the right removed the shoulder 130 from engagement with the lower end of the rod 132, the pressure within the pressure chamber 247 is operative, by means of the stem 250, lever 252 and its connection with the upper end of the rod 132 to maintain the shoulder 134 in contact with the movable member of the pilot valve 136 to permit the application of pressure fluid to the pressure chamber 153 of the servomotor 150 to maintain the igniter fluid supply valve 40 open. If the igniter fluid has not been consumed, the flow of igniter fluid into the combustion chamber continues during shut down.

The pressure chamber 175 of the servomotor 172 is vented to atmosphere by way of conduit 170, ports 168 and 164 of the pilot valve 116, branch 114, conduit 112 and ports 110 and 108 of the pilot valve 104, while the pressure chamber 239 of the servomotor 172 receives fluid under pressure by way of ports 232 and 235 of the pilot valve 228, conduit 226, ports 224 and 236 of the pilot valve 218, and conduit 238 to the pressure chamber 239, to move the link 176 to the left to close the fuel supply valve 24. This movement of the link 176 brings the shoulder 178 away from engagement with the rod 178, permitting movement of the movable members of the pilot valves 182 and 184 to open the pressure port 194 and to close discharge port 196, and to open the discharge port 200 and to close the pressure port 198. Pressure fluid from the pressure chamber 213 of the servomotor 206 is permitted to escape to atmosphere by way of the conduit 212 and ports 210 and 200 of the pilot valve 184, and fluid under pressure is admitted into the pressure chamber 205 by way of the ports 194 and 202 of the pilot valve 182, and conduit 204. The link 216 of the servomotor 206 is thereby moved to the right to close the oxidizer supply valve 34.

When the pressure within the combustion chamber 12 drops as a result of the closing of the fuel and oxidizer supply valves 24 and 34, the pressure within the pressure chamber 247 drops, whereby the spring 140 of the pilot valve 136 forces down the rod 132 and causes rotation of the movable member of the pilot valve in a counterclockwise direction to close the pressure port 142 and to open the discharge port 144, which permits the discharge of pressure fluid from the pressure chamber 153 of the servomotor 150 by way of the conduit 148 and ports 146 and 144 of the pilot valve 136, whereupon the link 154 moves toward the right to close the igniter fluid supply valve 40. The movement of the link 154 toward the right moves the shoulder 152 thereon from engagement with the lower end of the rod 158, thereby permitting rotation of the movable member of the pilot valve 160 by the spring 169 in a counterclockwise direction to open discharge port 166 to atmosphere, and to close port 164 which communicates with the branch 114, and also permitting rotation of the movable member of the pilot valve 218 in a clockwise direction under the force of the spring 227 to open the pressure port 222 and to close the port 224. Pressure fluid from port 222 is effective by way of the port 236, conduit 238 and pressure chamber 239 of the servomotor 172 to maintain the fuel supply valve 24 closed, while the pressure chamber 175 of the servomotor 172 is vented to atmosphere by way of the conduit 170, and ports 168 and 166 of the pilot valve 160.

From the foregoing, it is evident that I have devised a method of operation of a rocket engine, and an apparatus for performing this method of operation, which perform one predetermined schedule of operating the various control valves and switches to effect starting, and which perform a different predetermined schedule in shut down. Thus, in starting, on a signal from the programming device 80, the pre-start solenoid is energized, admitting high pressure helium to open the fuel and oxidizer relief valves, to allow fuel and oxidizer to flow through their respective pumps for cooling purposes so that the fuel and oxidizer can be maintained in liquid form in the supply lines. The pre-start solenoid is then deenergized and the start solenoid is energized to admit high pressure helium which, among other things, causes the fuel relief valve to be rescheduled to a higher level. The high pressure helium moves the trap valve to an open position, which, in turn, moves a pilot valve to port high pressure helium to the igniter fluid supply valve. The igniter fluid supply valve opens and a pilot valve, attached thereto, is moved to port high pressure helium to one side of a servomotor and to connect the other side to atmosphere, to open the fuel supply valve. Opening of the fuel supply valve causes movement of an attached pilot valve to port high pressure helium to one side of a servomotor and to connect the other side to atmosphere to open the oxidizer supply valve. The igniter switch is normally closed so that the igniter is activated on the start signal. When combustion occurs the combustion chamber pressure $P_c$ rises causing the normally closed igniter switch to open and causing the pilot valve, connected with the trap valve servomotor, to remain in the helium porting position.

On engine shut down, the start solenoid is deenergized thereby venting the trap valve servomotor to ambient atmosphere to close the trap valve. However, the pilot valve stays in the open position due to the high level of $P_c$. At the same time the function of the fuel relief valve is rescheduled, and the main fuel supply valve is closed due to the reversal of the helium and ambient atmosphere connections in the pilot valves connected with the igniter fluid supply valve servomotor. As a result of the closing of the fuel supply valve, the closing of the oxidizer supply valve follows. Combustion ceases, causing $P_c$ to drop, thereby allowing the pilot valve attached to the trap valve servomotor to port ambient atmospheric pressure to the igniter fluid supply servomotor. The igniter fluid supply valve closes and the igniter switch moves to its normally closed position, whereby all of the various control elements are in position ready for refire.

It is evident, from the foregoing, that electrically operated servomotors may be used in place of the fluid actuated servomotors described above.

It will be understood that various changes may be made in the details of construction and in the arrangement of the parts of the system disclosed herein without departing from the principles of the invention and from the scope of the annexed claims.

I claim:

1. A method of operating a rocket engine having a combustion chamber, pumps to supply liquid oxidizer and liquid fuel to the combustion chamber, relief valves between each pump and the combustion chamber, supply valves in the supply lines between the pumps and the combustion chamber, means to supply igniter fluid to the combustion chamber including a supply valve, an igniter including a circuit having a normally closed switch, a thrust control device, responsive to combustion chamber pressure, including a trap valve between the combustion chamber and the thrust control device, comprising the starting steps: (1) energizing the igniter; (2) loading the fuel relief valve to permit functioning at a higher pressure; (3) opening the trap valve; (4) opening the supply valve in the igniter fluid supply line; (5) opening the fuel supply valve; (6) opening the oxidizer supply valve; and (7) when combustion occurs in the combustion chamber, deenergizing the igniter by opening the normally closed switch.

2. A method of operating a rocket engine as defined in claim 1, including the initial steps of opening and closing the relief valves in the fuel and oxidizer lines to permit fuel and oxidizer to flow through and precool the pumps.

3. A method of operating a rocket engine as defined in claim 1, including the following shut down steps: (8) closing the trap valve; (9) unloading the fuel line relief valve to permit functioning at a lower pressure; (10) closing the fuel supply valve; (11) closing the oxidizer supply valve; (12) closing the igniter fluid supply valve; and (13) closing the igniter switch.

4. A method of operating a rocket engine as defined in claim 1, including the following steps: (8) initially opening and then closing the relief valves in the fuel and oxidizer supply lines to permit fuel and oxidizer to flow through and precool the pumps; and, in shut down, (9) closing the trap valve; (10) unloading the fuel line relief valve to permit functioning at a lower pressure; (11) closing the fuel supply valve; (12) closing the igniter fluid supply valve; and (14) closing the igniter switch.

5. A method of shutting down a rocket engine having a combustion chamber, a fuel supply line including a pump, a relief valve and a supply valve, an oxidizer supply line including a pump, a relief valve and a supply valve, an igniter fluid supply line to provide an igniting flame including a supply valve, an igniter circuit including an igniter and a normally closed switch, a thrust control device, responsive to combustion chamber pressure, including a valved connection with the combustion chamber, comprising the steps: (1) closing the valve in the connection between the combustion chamber and the thrust control device to make the thrust control insensitive to combustion chamber pressure; (2) unloading the relief valve in the fuel supply line to permit functioning at a lower pressure; (3) closing the fuel supply valve; (4) closing the oxidizer supply valve; (5) closing the igniter fluid supply valve; and (6) closing the previously opened igniter switch.

6. A rocket engine, comprising: a combustion chamber; fuel supply means including a pump, a relief valve and a supply valve, said relief valve having a pressure chamber to load the valve; oxidizer supply means including a pump, a relief valve and a supply valve; igniter fluid supply means including a supply valve; an igniter including a circuit having a normally closed switch; a thrust control device, responsive to combustion chamber pressure, including a connection with the combustion chamber and a trap valve therein; and a sequencing system, including a first servomotor connected with said trap valve, a second servomotor connected with said igniter fluid supply valve, a third servomotor connected with said fuel supply valve, a fourth servomotor connected with said oxidizer supply valve, a pressure responsive means connected with said switch, a connection between said pressure responsive means and said combustion chamber, a first pilot valve connected with said fuel relief valve pressure chamber and with said first servomotor, and operable, in one position, to open said trap valve and to admit pressure fluid to said pressure chamber to load said relief valve, a second pilot valve movable in response to movement of said first servomotor, including connections with said second servomotor, and operable to open and close said igniter fluid supply valve, a third pilot valve movable in response to movement of said second servomotor, including connections with said third servomotor, and operable to open and close said fuel supply valve, and a fourth pilot valve movable in response to movement of said third servomotor, including connections with said fourth servomotor, and operable to open and close said oxidizer supply valve.

7. A rocket engine as defined in claim 6, in which said fuel relief valve includes a fifth servomotor, and in which said oxidizer relief valve includes a sixth servomotor, a fifth pilot valve, and connections between said fifth pilot valve and said fifth and sixth servomotors whereby operation of said pilot valve is effective to open and close said relief valves.

8. A rocket engine as defined in claim 7, including a programming device to sequentially operate said fifth pilot valve, said igniter, and said first pilot valve to effect starting and shut down operation of the rocket engine.

9. A rocket engine as defined in claim 6, including a sixth pilot valve, a seventh pilot valve operable in response to movement of said second servomotor, including connections with said third servomotor, a connection between said sixth and said seventh pilot valves, and a common means for actuating said first and said sixth pilot valves.

10. A rocket engine, comprising: a combustion chamber; fuel supply means including a pump, a relief valve and a supply valve, said relief valve having a cylinder and a piston connected with a movable valve element; oxidizer supply means, including a pump, a relief valve and a supply valve, said relief valve having a cylinder and a piston connected with a movable valve element; igniter fluid supply means including a supply valve; an igniter including a circuit having a normally closed switch; pressure actuated means to open said switch including a connection with said combustion chamber; a thrust control device, responsive to combustion chamber pressure, including a connection with the combustion chamber and a trap valve therein; and a sequencing system, including a first servomotor connected with said trap valve, a second servomotor connected with said igniter fluid supply valve, a third servomotor connected with said fuel supply valve, a fourth servomotor connected with said oxidizer supply valve, a first pilot valve having connections with said first servomotor and with the cylinder of the fuel supply relief valve on one side of the piston, a second pilot valve including connections with said second servomotor, movable in response to movement of said first servomotor, and operable to control movement of said igniter fluid supply valve, a third pilot valve movable in response to movement of said second servomotor, including connections with said third servomotor and operable to control movement of said fuel supply valve, a fourth pilot valve, movable in response to movement of said third servomotor, including connections with said oxidizer supply valve, means connecting said first and said third pilot valves, a fifth pilot valve including connections with the cylinder of said fuel relief valve on the other side of the piston and with the cylinder of the oxidizer relief valve on one side of the piston, a sixth pilot valve, a seventh pilot valve movable in response to movement of said second servomotor, a connection between said seventh pilot valve and said third servomotor, and a connection between said sixth and said seventh pilot valves.

11. A rocket engine as defined in claim 10, including additional means, responsive to combustion chamber pressure, connected with said second pilot valve, said additional means being effective, in response to combustion chamber pressure, to connect said second pilot valve with a pressure source to actuate said second servomotor even though said first servomotor be in an inactive position.

12. A rocket engine as defined in claim 10, in which said connection between said sixth and said seventh pilot valves is effective to connect one port of the seventh pilot valve with a fluid pressure or to ambient atmosphere, in dependence on the position of said sixth pilot valve, said seventh pilot valve including another port connected with a source of fluid under pressure.

13. A rocket engine as defined in claim 10, including a first solenoid connected with said fifth pilot valve and a second solenoid connected with said first and said sixth pilot valves, and a programming device connected with said solenoids and with said igniter circuit, said first solenoid operable, when energized, to admit pressure fluid to said fuel and oxidizer relief valves to open the same, and said second solenoid operable, when energized, to connect said first pilot valve with a source of pressure fluid and to connect said sixth pilot valve with atmosphere, and when deenergized, to connect said sixth pilot valve with a source of pressure fluid and to connect said first pilot valve with the ambient atmosphere.

14. In a rocket engine having a combustion chamber, a fuel supply line to said combustion chamber, said fuel supply line having a pump, a relief valve and a supply valve, an oxidizer supply line to said combustion chamber, said oxidizer supply line having a pump, a relief valve and a supply valve, igniter fluid supply means including a supply valve to provide an igniting flame for said combustion chamber, an ignition circuit including an igniter and a normally closed switch, a thrust control device responsive to combustion chamber pressure, conduit means connecting said thrust control device to said combustion chamber and having a trap valve therein; a sequencing system, comprising: means for energizing the igniter, means for loading the fuel line relief valve concomitantly with the energizing of the igniter to raise the pressure level at which said relief valve opens, means for opening the trap valve in the connection between the combustion chamber and thrust control device concomitantly with the loading of the fuel line relief valve, means for opening the valve in the igniter fluid supply means subsequent to opening of the trap valve, means for opening the fuel supply valve subsequent to the opening of the igniter fluid supply valve, means for opening the oxidizer supply valve subsequent to opening of the fuel supply valve, and means for deenergizing the igniter by opening the normally closed switch on the occurrence of combustion in said combustion chamber.

15. In a rocket engine as defined in claim 14, in which the sequencing system includes means for opening and closing the relief valves in the fuel and oxidizer supply lines to permit fuel and oxidizer to flow through and precool the pumps prior to energizing said igniter.

16. In a rocket engine as defined in claim 14, in which the sequencing system includes, on engine shut down, means for closing the trap valve, means for unloading the fuel line relief valve concomitantly with closing the trap valve to lower the pressure level at which said relief valve opens, means for closing the fuel supply valve concomitantly with the unloading of the fuel relief valve, means for closing the oxidizer supply valve subsequent to closing the fuel supply valve, means for closing the igniter fluid supply valve in response to a decay in combustion chamber pressure, and means for closing the igniter switch concomitantly with closing the igniter fluid supply valve.

References Cited in the file of this patent
UNITED STATES PATENTS

| | | |
|---|---|---|
| 2,574,495 | Parker | Nov. 13, 1951 |
| 2,704,438 | Sheets | Mar. 22, 1955 |
| 2,779,158 | Dungan | Jan. 29, 1957 |
| 2,844,942 | Reynolds | July 29, 1958 |
| 2,928,240 | Burton et al. | Mar. 15, 1960 |
| 2,930,187 | Chillson et al. | Mar. 29, 1960 |
| 2,984,985 | MacMillin | May 23, 1961 |